Jan. 29, 1929.　　　　　　　　　　　　　　　　　　1,700,372
C. H. LEINERT
VALVE FOR COMPRESSORS
Filed May 4, 1925
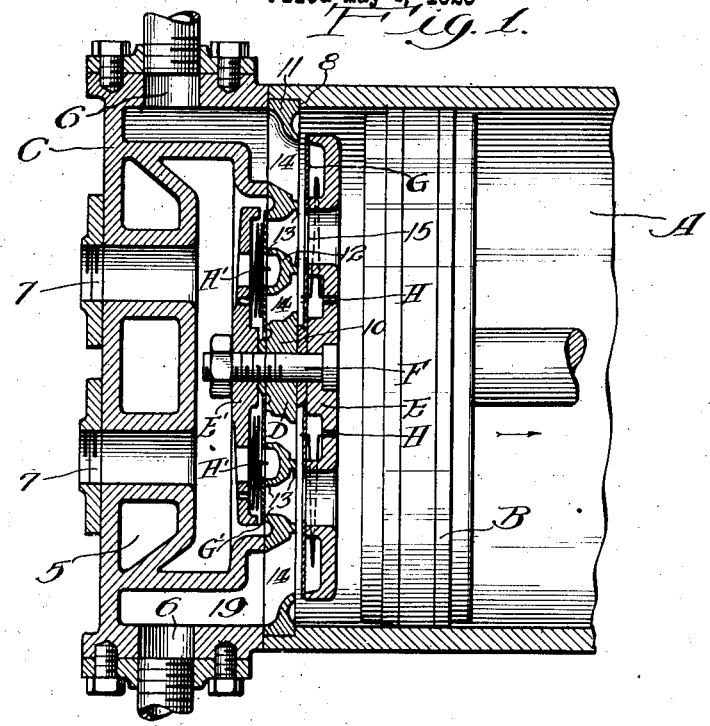
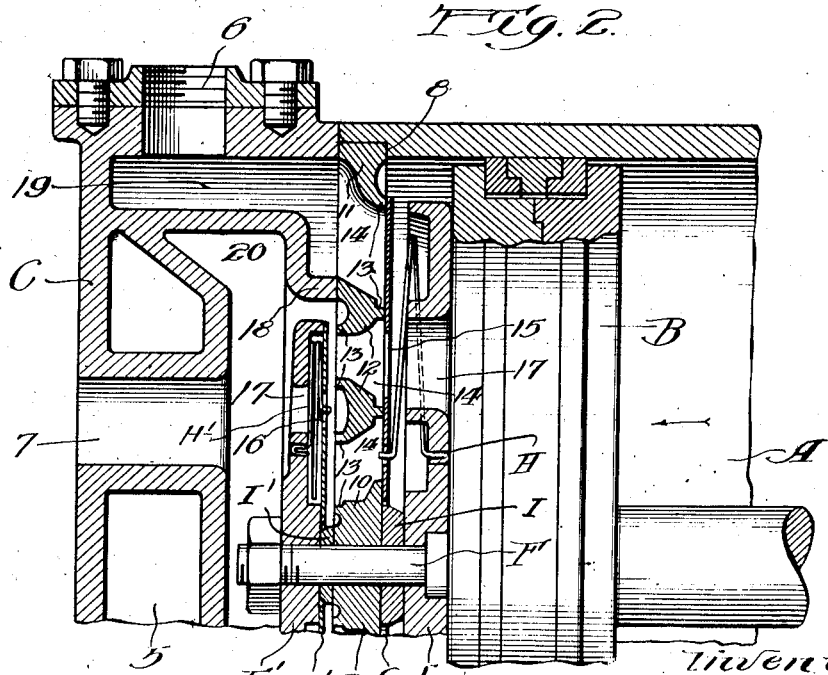
Inventor:
Charles H. Leinert,
by Chining V[illegible]
Attys Patented Jan. 29, 1929.

1,700,372

UNITED STATES PATENT OFFICE.

CHARLES H. LEINERT, OF CHICAGO, ILLINOIS, ASSIGNOR TO LEINERT VALVE COMPANY, OF CHICAGO, ILLINOIS, A CORPORATION OF ILLINOIS.

VALVE FOR COMPRESSORS.

Application filed May 4, 1925. Serial No. 27,682.

This invention relates to a valve, either suction or discharge, which is particularly adapted for use with compressors and blowing engines.

It is a primary object herein to provide a valve which is duplex in character, i. e., a single valve structure which will operate on both the compression and suction strokes. In this respect it differs from the valves commonly used with blowers which discharge relatively large volumes of air at comparatively low pressures. Such blowers are generally operated at high speed, so that the check valves controlling the inlet and discharge ports for air are also reciprocated at high speed. Owing to the peculiar conditions under which such valves are required to operate, they are subjected to hard usuage resulting in an abbreviated serviceability. Also the valves employed in such services must open and close successively with each alternate stroke of the compressor piston, and consequently two sets of valves must be used, one for the intake, and the other for the discharge, of air. By the improvements which have been incorporated into the valve of my present invention, it is possible to use a single set of valves to accomplish this double purpose, so that a great advance in economy is achieved, as is also an increase in the ported area available.

Other objects and uses of my invention will also appear from the specification and claims to follow, taken in conjunction with the accompanying drawing which illustrates one embodiment thereof in the manner following:

Figure 1 is a longitudinal section through the head end of a compressor or blowing engine showing one of the present duplex valves applied thereto; and Fig. 2 is a fragmentary and enlarged view of the valve in longitudinal section, showing its parts in a position which is opposite to that presented in Fig. 1.

A compressor or blowing engine of the kind to which my invention is applicable may have conventional cylinder walls A wherein is recpirocated a piston B. The cylinder head C may be suitably cored to provide interior passages 5 through which water is circulated. It includes also certain ports 6 and 7, the former on the sides and the latter on the end, through which air is taken in or discharged. Suitable conduits or pipes for this purpose are, of course, connected to these ports.

At the end of the cylinder adjacent the head, is a seat 8 whereon is received the valve of my invention. This includes a seat member D with which are associated two stop plates E and E' detachably connected to opposite ends of the seat as through the medium of a bolt F. Interposed between the seat member and the two stop plates are a pair of valves G and G' each in the form of a centrally apertured disk. Two sets of spring means H and H' are also arranged to the outside of the valve disks G and G', respectively, whereby they tend normally to remain seated upon the member D. The parts just enumerated are the principal ones entering into the construction of the present valve, but they are specially formed to co-operate with each other in a peculiar manner, as will now be explained.

The seat member which lies intermediately of the two stop plates may be formed with a hub 10, a peripheral rim 11, two intermediate circular walls 12, and with certain annular ribs 13 against which the two valve disks are seated. Each disk may, therefore, rest upon the several ribs as well as upon the central hub, when moved to the positions shown. As through the medium of a pair of distance pieces I and I' having inclined peripheral walls, the two disks are properly guided and centralized. Each distance piece serves as a spacer between the seat member and its associated stop plate, whereby these parts remain separated a desired distance.

The valve parts on opposite sides of the seat member are of different diameter. It will be noted that the stop plate E and disk G extend to the rim 11, but short of the cylinder walls A, whereas the plate E' and disk G' reach only to the outer circular wall 12. The hub, rim, and intermediate walls of the seat member are, of course, interconnected in some suitable manner as by spokes or webs, leaving arcuate shaped ports 14 of ample size for the passage of air. In the valve disk G are ports 15 which occur between the walls 12 but not elsewhere, the disk G' being also ported as at 16, directly opposite to the inner circular wall 12 where I have shown double ribs 13 in spaced relation. In like manner each stop plate is ported as at 17 in register with the ports in its associated disk. Also fitting against the outer circular wall 12 is a wall 18 forming part of the cylinder head C, and dividing the same into separate chambers 19 and 20 with which communicate, respectively, the openings 6 and 7. The former of these chambers has communication with the cylinder A, around and through the valve disk G, but only when the same is lifted from its seat, whereas a like communication with the other chamber can be established only through and around the valve disk G', when it is unseated.

In the operation of the compressor, air is drawn through the ports 6 on the suction stroke of the piston, the parts being then related as shown in Fig. 1. The air travels through the chamber 19, ports 14, 15 and 17, and also around the periphery of the disk G and stop plate E, this disk being elevated from its seat during the suction stroke of the piston. At the same time the disk G' is held to its seat by the spring means H', thereby closing all communication with the chamber 20. On the return or compression stroke of the piston, the parts undergo a reversion in relationship, as appears clearly from Fig. 2. Here the disk G is shown to be seated, thereby closing all communication between the cylinder and the chamber 19. Through the ports 17 and 15 air is forced against the disk G' which is thereupon seated against the tension of the spring means H' to open up a passage for the discharge of air around and through this disk. The air so discharged travels through the chamber 20 and out through the ports 7. It thus appears that a single valve structure when constructed in accordance with my invention serves both for suction and pressure purposes, and requires no supplementary set of valves to operate in either one or the other of these capacities.

Aside from the advantages in economizing in the number of valves necessary for the equipment of a compressor, the structure herein shown may be associated with a cylinder head having water cooled passages for reducing the air temperature so as to obtain an increased efficiency. Each valve in its entirety may be readily demounted from operative position, as by removal of the cylinder head, or the cage in which the valve is carried. The valve constituents are fewer in number than would be required where two sets of valves are used, and this circumstance alone promotes increased reliability and certainty in operation. It is to be understood, of course, that my invention is susceptible of modification in many respects without departing from the underlying principles which impart novelty thereto, and accordingly I desire to be protected in all such changes or modifications as may fall within the purview of the appended claims.

I claim:

1. In combination with a compressor, a valve structure of the kind described having a seat member extending to a wall of the compressor, a valve disk and stop plate positioned on one side of the seat member and extending to a point short of the compressor wall, the seat member having a peripheral wall, a hub, and an intermediate circular wall, a head fitted to the compressor having a partition wall in register with the intermediate circular wall of the seat member and dividing the compressor head into separate chambers, a second stop plate and valve disk positioned on the head side of the seat member and extending for a distance less than the partition wall, the seat member and one valve disk, together with the stop plate, having registering ported openings, and the other stop plate and valve disk having aligned openings out of register with those first mentioned, whereby alternate reciprocation of the two valve disks will open up through the seat member one-way passages which extend around and through each valve disk and stop plate, substantially as described.

2. In combination with a compressor, a valve member having opposing valve seats, rigid annular valve disks operatively associated with the seats, stop plates for each valve disk, spacing devices between said stop plates and said valve member, ports through each of the valve parts to open one-way passages through the valve member on alternate reciprocation of the two disks, and a holding element passing through the valve member, stop plates, and spacing devices.

CHARLES H. LEINERT.